United States Patent
Steffes et al.

[11] Patent Number: 5,826,545
[45] Date of Patent: Oct. 27, 1998

[54] ANIMAL CAGING SYSTEM

[75] Inventors: John T. Steffes, Olney; Joseph M. Erwin, Gaithersburg; John C. Landon, Potomac, all of Md.

[73] Assignee: Diagnon Corporation, Rockville, Md.

[21] Appl. No.: 529,494

[22] Filed: Sep. 18, 1995

[51] Int. Cl.[6] ................................................. A01K 3/00
[52] U.S. Cl. ................................................... 119/473
[58] Field of Search ............................. 119/452, 453, 119/472, 473, 482, 489, 496, 498

[56] References Cited

U.S. PATENT DOCUMENTS

| | | |
|---|---|---|
| 3,367,308 | 2/1968 | Quattrone et al. |
| 3,467,064 | 9/1969 | Glass et al. ................................ 119/17 |
| 3,651,786 | 3/1972 | Patterson et al. ......................... 119/17 |
| 3,698,360 | 10/1972 | Rubricius .................................. 119/17 |
| 3,760,768 | 9/1973 | Patterson .................................. 119/17 |
| 3,830,201 | 8/1974 | Coulbourn ................................. 119/17 |
| 3,918,406 | 11/1975 | Patterson .................................. 119/96 |
| 4,016,833 | 4/1977 | Ray ............................................ 119/17 |
| 4,120,266 | 10/1978 | Oloff et al. ............................. 119/103 |
| 4,365,590 | 12/1982 | Ruggieri et al. .......................... 119/15 |
| 4,402,280 | 9/1983 | Thomas ..................................... 119/15 |
| 4,526,133 | 7/1985 | LoMaglio ................................... 119/17 |
| 4,699,088 | 10/1987 | Murray et al. ............................ 119/18 |
| 4,727,825 | 3/1988 | Houghton .................................. 119/29 |
| 4,798,171 | 1/1989 | Peters et al. ............................. 119/15 |
| 4,841,911 | 6/1989 | Houghton .................................. 119/29 |
| 4,862,831 | 9/1989 | Graham ..................................... 119/15 |
| 4,951,601 | 8/1990 | Maydan et al. ......................... 119/719 |
| 4,953,500 | 9/1990 | Savage-Rumbaugh et al. ......... 119/17 |
| 5,000,120 | 3/1991 | Coiro, Sr. et al. ....................... 119/15 |
| 5,036,795 | 8/1991 | Houghton .................................. 119/17 |
| 5,116,255 | 5/1992 | Keeling et al. ........................... 119/18 |
| 5,165,362 | 11/1992 | Sheaffer et al. .......................... 119/15 |
| 5,190,879 | 3/1993 | Wolfe et al. ............................... 119/15 |
| 5,247,901 | 9/1993 | Landon et al. ............................ 119/15 |
| 5,311,836 | 5/1994 | Shaeffer et al. .......................... 119/17 |
| 5,349,924 | 9/1994 | Hooper, Jr. ........................... 119/472 X |
| 5,571,241 | 11/1996 | Nagata ..................................... 119/473 |

OTHER PUBLICATIONS

Lenderking Caging Products, Baltimore, MD.
Allentown Caging Equipment, Allentown, NJ.
BioBubble, Ft. Collins, CO
Watson, D.S.B., Laboratory Animal Science, vol. 41, No. 4, 1991.

*Primary Examiner*—Thomas Price
*Attorney, Agent, or Firm*—Arnold, White & Durkee

[57] ABSTRACT

Animal caging systems adaptable for individual and group housing are disclosed. In addition, improved features for use with animal caging systems including food dispensers, airtight lateral access panels and squeezeback mechanisms are provided.

23 Claims, 11 Drawing Sheets

ANIMAL CAGING SYSTEM

I. FIELD OF THE INVENTION

This invention relates to an improved housing system for animals. More particularly, this invention relates to a modular housing system and related accessories, primarily for use with non-human primates.

II. BACKGROUND

Animal care facilities house animals in a variety of enclosures, including single, paired and group housing. Animals housed in individual cages for substantial intervals, especially when they are young, may develop depression or persistent patterns of abnormal behavior due to social deprivation, lack of cognitive stimulation, and inability to manipulate or otherwise exert control over the environment, Animal welfare regulations now require social housing for non-human primates, except when not possible for well-substantiated clinical or scientific reasons.

Microbiological containment is one situation where isolation is required for human and/or animal safety, experimental control or routine quarantine associated with shipment in or out of a facility. Often, standard cages are employed but the animal is sequestered in a separate room. Typically, available isolation housing systems are small, restrictive and do not contain amenities such as lateral windows, perches, swings, resting benches, manipulable objects, foraging devices and other environmental enrichment tools. Thus, when non-human primates are subjected to microbiological isolation in conventional isolation cages, activity and social interaction with conspecifics is severely restricted, if not completely eliminated. The "one animal/one cage" approach to housing also has proved limiting for reasons other than enrichment and group housing. For example, as size requirements change, either by animal welfare regulations or by virtue of an animal's growth, cages become outdated. Isolation need not always involve segregation of individual animals, as pair or group isolation is possible. This proves difficult, however, given the arrangement of prior art enclosures.

Another problem with prior art caging systems relates to maintenance and sanitization. The cleaning process typically relies on transport of cages to a washing area, necessitating transfer of animals out of the cages. Moreover, where group housing is involved, the size of such caging units often is a significant limitation to their mobility. Even where cages are mobile, the mobility itself is a potential problem. For example, wheeled cages tend to travel as a result of animal activity, even where braking mechanisms are used. In addition, transfer of an animal from a dirty biocontainment unit to a clean one using a transfer box or tunnel increases prospects of cross-contamination if transfer mechanisms are not fully sanitized after each use.

A useful feature of caging systems is a movable rear panel know as a "squeezeback." This permits restriction of the animal's movement to allow for medication or chemi-immobilization. These systems were first described for the handling of dangerous animals, such as lions and tigers. For example, U.S. Pat. No. 3,918,406 describes a system operated by an articulable level assembly located outside of the cage to move an entire side wall of the cage towards the opposite wall for squeezing of the animal toward and through an opening. Though simple in principle, implementation of this feature has been problematic. For example, ease of adjustment and locking it into any desired position have not been adequately addressed. Moreover, prior art squeezeback systems do not permit removal of the unit for separate cleaning or if not needed.

Another important feature of an animal housing unit is the food cup or "hopper." Most food cups have an open top for easy monitoring and refilling. The cups also have a second opening through which the animal gains access to the food. This arrangement presents a safety hazard to workers and animals alike, as it is not uncommon for an animal to reach through the cup and grab or scratch the worker, thereby transmitting pathogens. As for the animals, it is possible for the animal's hand or arm to become lodged while attempting to traverse the openings in the feed cup, resulting in serious injury or, at a minimum, time and expense in extraction by caretakers. Prior art efforts at eliminating this problem, using expensive baffles or barriers, have proven only marginally effective. Moreover, such devices visually restrict monitoring of dietary intake, removal of uneaten food and assessment of the need for cleaning.

Thus, while the present caging systems represent an advance over those used in the past, there remain numerous shortcomings to be addressed. The shortcomings include both special features of the cages as well as their overall configuration and adaptation for use.

III. SUMMARY OF THE INVENTION

The present invention, in a broad aspect, provides animal caging systems that are adaptable for use in individual and group housing. More specific aspects of the present invention to include improved squeezeback cage devices, improved food dispensers and biocontainable lateral access panels for biocontainment modules.

In a broad aspect, a caging unit is provided that comprises a chamber that, by virtue of access panels placed on the sides of the cage to the rear of the unit, can be combined with other similar chambers to vary the size of the housing area. These cages may be equipped with means for attaching the cages side-by-side and in an "over-and-under" configuration.

In a preferred embodiment, caging units of the present invention possess a squeezeback feature where the rear of the cage can be moved towards the front of the caging, effectively reducing the interior of the chamber and squeezing any animal present in the interior.

When the squeezeback and rear-positioned, access side panels are combined into a single caging unit of the present invention, the use of a squeezeback feature divides the chamber into two separate housing areas. When the squeezeback is moved halfway to the front of the cage, two equal interior spaces are produced, with the forward space accessed through the front of the cage and the rearward space accessed through the side access panels.

In yet another embodiment, a feed dispenser is provided that contains a first opening, a movable top affording access to the interior of the dispenser by virtue of a second opening and at least one transparent surface. In one embodiment, the movement of the top to afford access to the interior results in the closing of the first opening.

Other objects, features and advantages of the present invention will become apparent from the following detailed description. It should be understood, however, that the detailed description and the specific examples, while indicating preferred embodiments of the invention, are given by way of illustration only. Various changes and modifications within the spirit and scope of the invention will become apparent to those skilled in the art from this detailed description.

IV. BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein:

FIG. 1 is an photographic illustration of an "over-and-under" two-chamber cage unit. The front and rear panels are wire screens. The top chamber has the squeezeback device in the half-way position, the squeezeback itself being a wire screen. Rear-positioned side access panels can be seen in the open position.

FIG. 2 is an illustration of a double-height cage unit. The front access door is glass and a perch is located in the rear of the cage approximately half-way between the top and the bottom surfaces. Rear-positioned side access panels can be seen in the open position.

FIG. 3 is an illustration of a "side-by-side" arrangement of multiple caging units having a common interior. The center cage is a double-height cage like that depicted in FIG. 2. The left and right cages are over-and-under configurations as shown in FIG. 1.

Figure 6A:
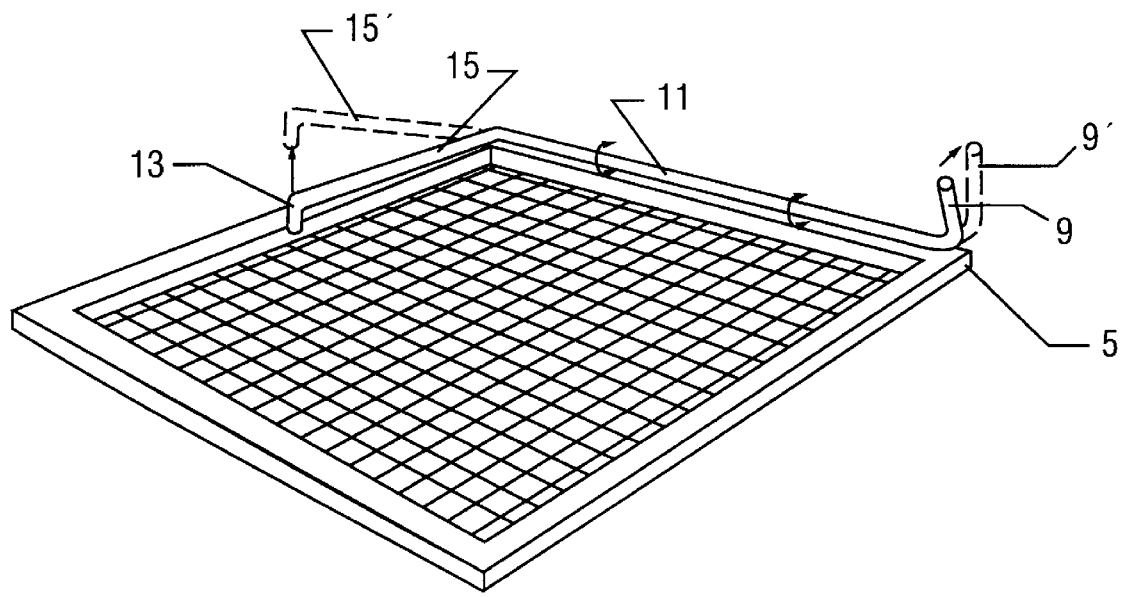
Figure 6B:
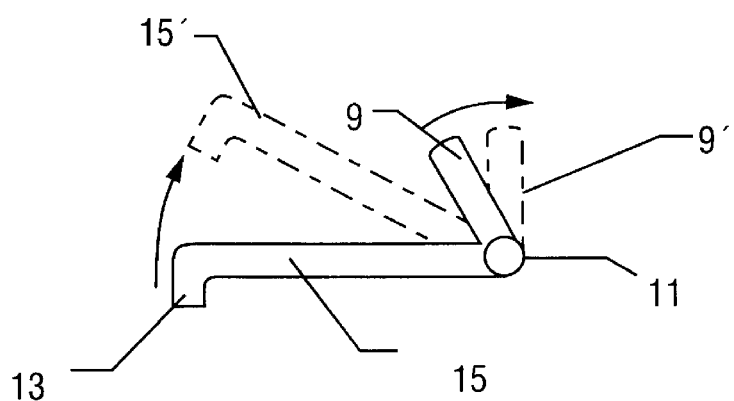

FIGS. 6A and 6B illustrate a squeezeback latching mechanism. FIG. 6A shows a bottom surface with a latch mechanism extending from the right front of the cage, down the right side of the bottom surface, and part way across the rear of the bottom surface. FIG. 6B shows a view down the long axis of the latch arm 11 and the rotation of the handle 9.

Figure 7:
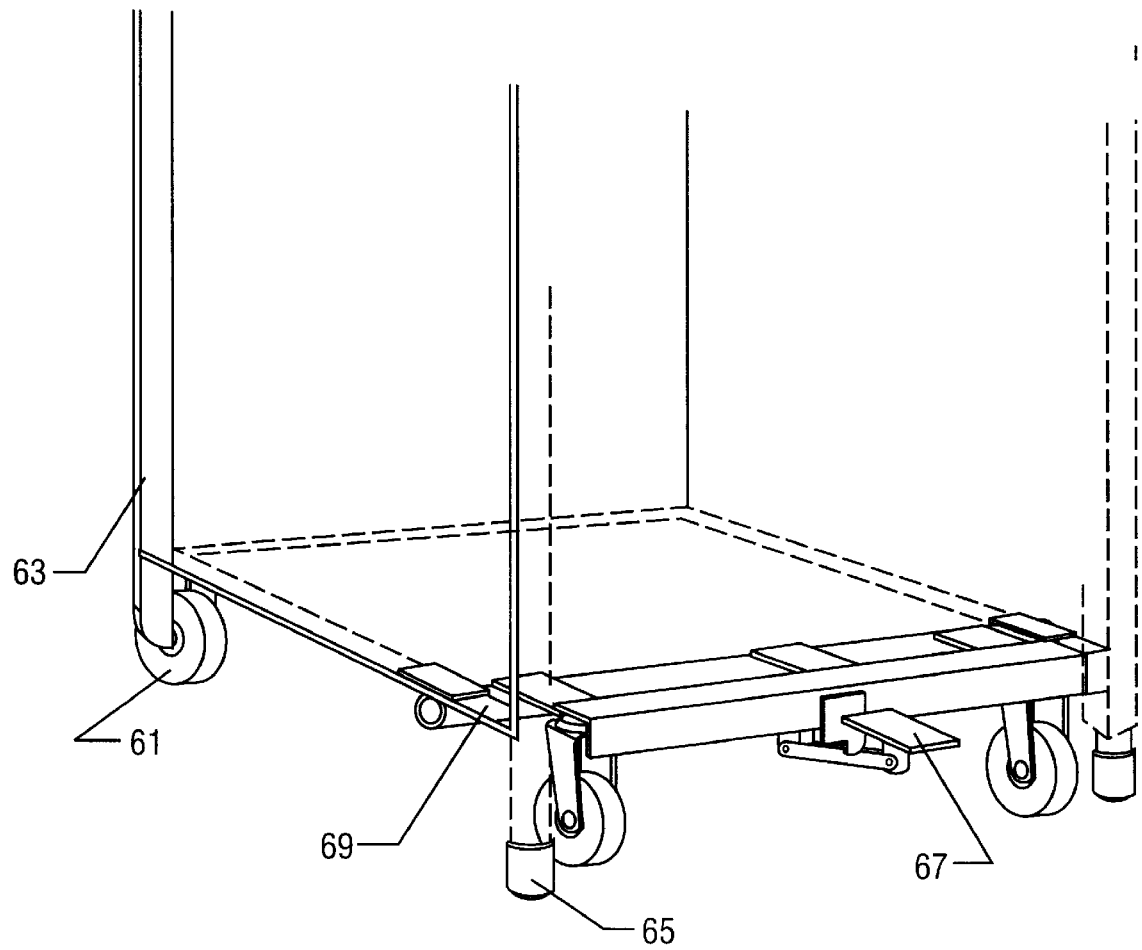

FIG. 7 is an illustration of a fulcrum device for grounding a cage frame. A foot pedal 67 to release the wheel assembly 64 is shown.

Figure 8A:
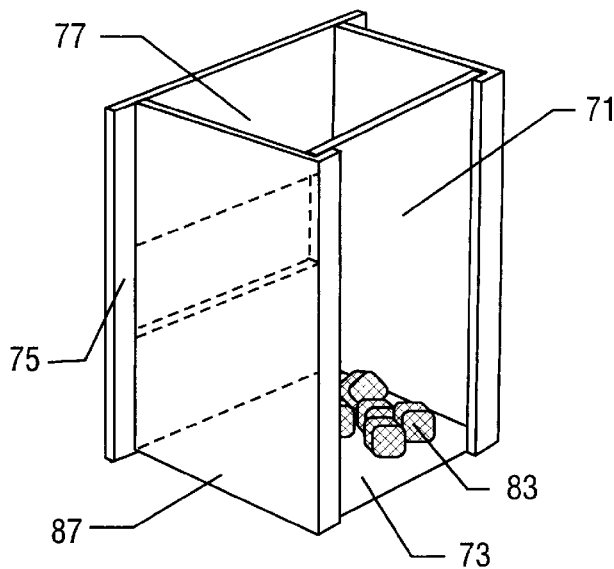
Figure 8B:
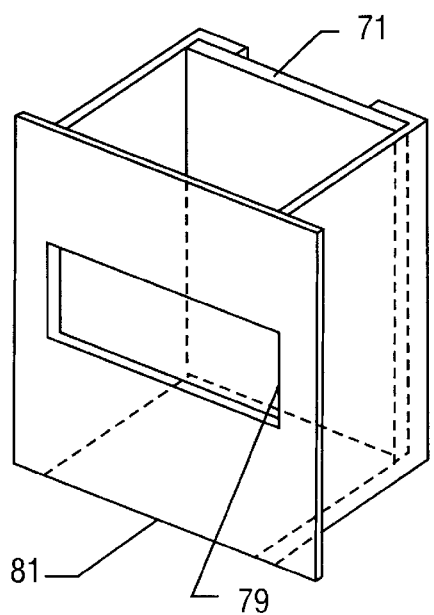
Figure 8C:
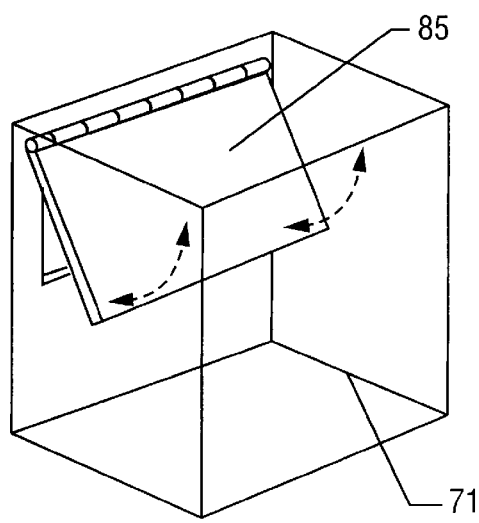

FIGS. 8A–C illustrate a feed dispenser. FIG. 8A and 8C are orthographic views showing the interior of the dispenser. FIG. 8B is an orthographic view with a cutaway in which the top is removed. FIG. 8C also shows a hinged top.

Figure 9:
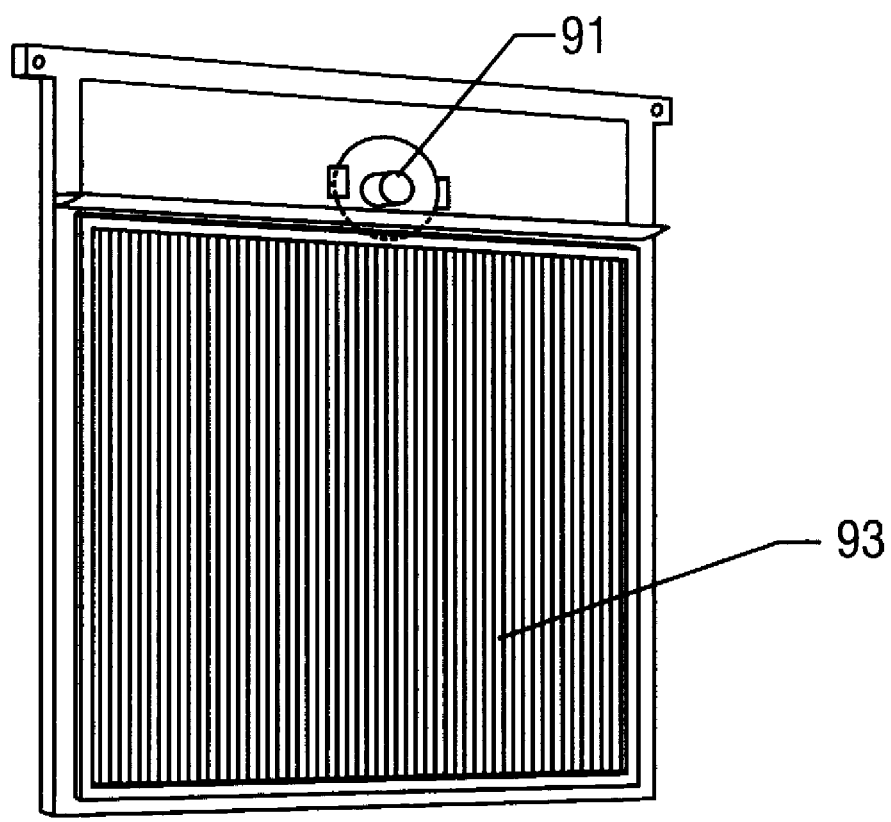

FIG. 9 is an illustration of a biocontainment module rear panel 93 and an exhaust port 91 located therein.

Figure 10A:
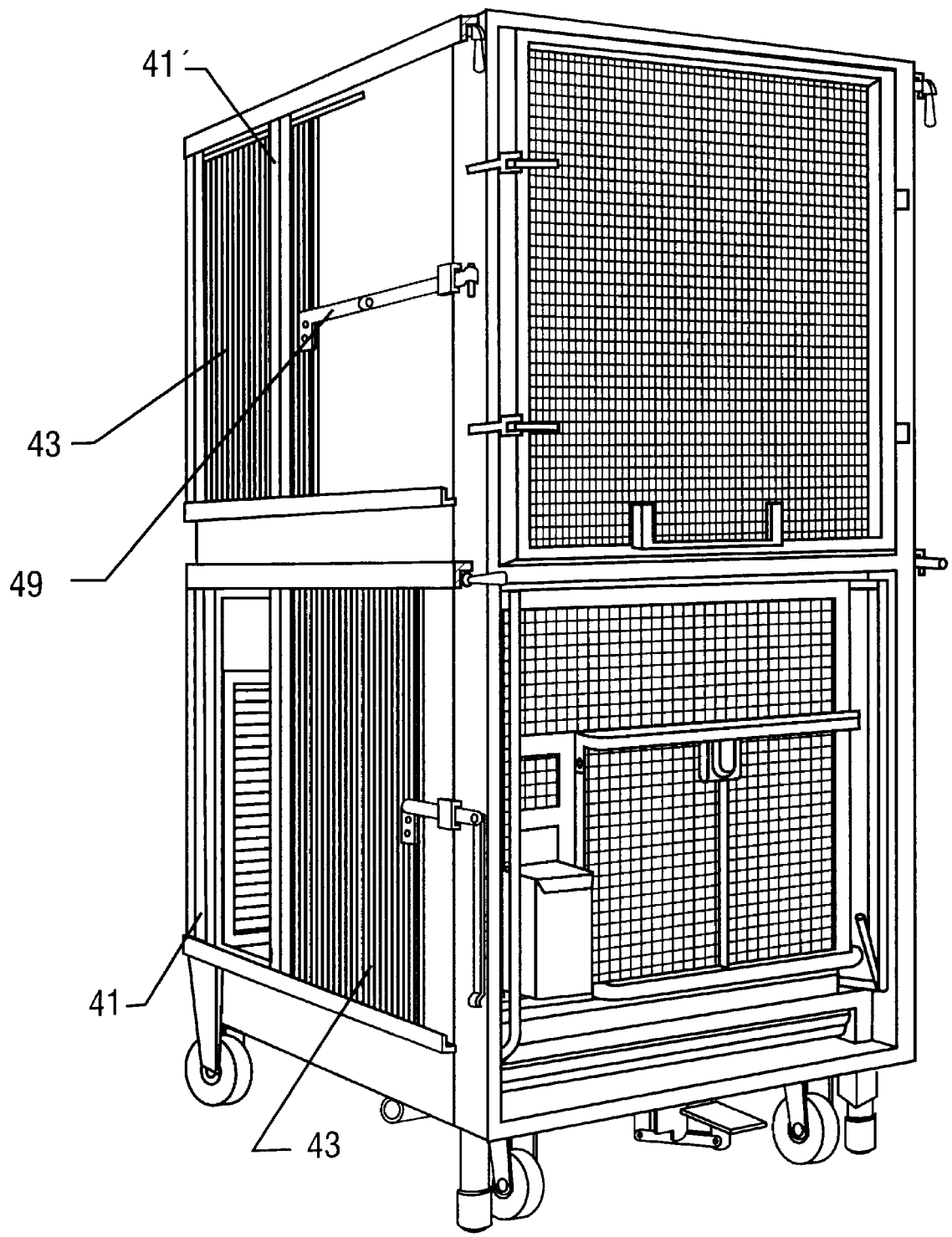
Figure 10B:
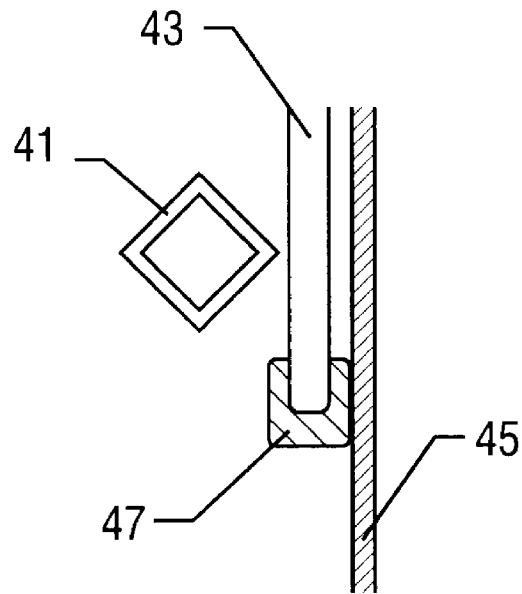
Figure 10C:
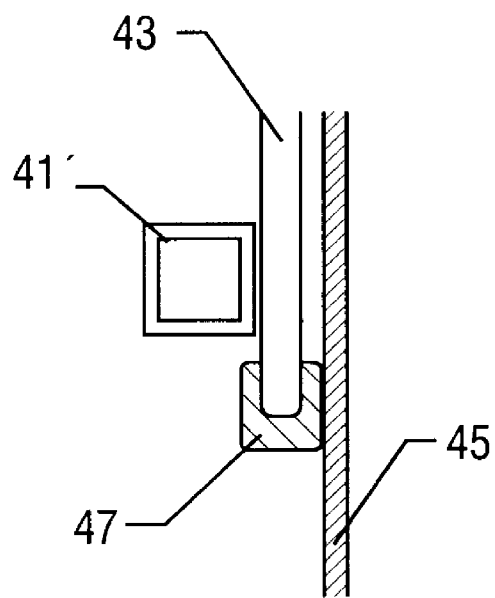

FIGS. 10A–C illustrate a biocontainment module and clamping mechanism therefor. FIG. 10A is an orthographic view. FIG. 10B and FIG. 10C show partial section view of a clamping mechanism for engaging the access panels in a sealed manner.

V. DETAILED DESCRIPTION OF THE INVENTION

A. Modular Caging System

One of the significant problems presented to investigators in animal research concerns the ever-changing requirements for housing of animals. Primarily, the requirements change as a result of legislative mandates for increased living area for individual research animals and increased access to a social environment where multiple animals are housed together. A secondary issue related to cage size is the growth of animals. As animals increase in size, the necessary living space also increases. When a caging unit becomes obsolete because of its dimensions, for whatever reason, that unit can no longer be used.

Therefore, in one aspect, the present invention addresses the foregoing problem by providing a caging system that can easily be modified to permit increased housing areas without the need to build new cages. Rather, by designing individual modules that can be arranged into a modular system, depending on space requirements, it is possible to readily adapt an existing cage inventory for particular uses.

The basic building block for this system comprises a chamber having a front surface, a back surface, a top surface, a bottom surface and two side surfaces. The front surface comprises an access panel, usually a door, for general access to the interior of the chamber. The side surfaces also comprise access panels, positioned at the rear of the chamber. These side access panels permit the interiors of multiple chambers, when arranged in a "side-by-side" fashion, to be joined, thus effectively creating a new caging area.

For example, under current guidelines, a chamber according to the present invention having 9.0 square feet of floor space may accommodate any of the following: (i) three USDA Group 2 non-human primates (3.0 sq. ft. ea.), (ii) two USDA Group 3 non-human primates (4.3 sq. ft. ea.), (iii) one USDA Group 4 or Group 5 non-human primate (6.0 or 8.0 sq. ft., respectively). For group or colony housing, multiple cages may be connected to provide the required floor space.

Prior art systems are available with side access panels that permit some combination of cages for the purpose of increasing housing size. These cages have lateral access panels at the front of the cage, however, which presents a significant limitation. Where a squeezeback function is utilized, the rear of the cage is rendered useless because no access is afforded thereto. By placing the side access panels at the rear of a squeezeback cage, operation of the squeezeback function actually creates a second, separate housing area.

This feature has four significant advantages. First, where animals are to be transported, the squeezeback function may be used to create additional capacity (i.e., increase the number of separate chambers in a cage unit) and reduce the workload on caretakers. Second, the divided chamber may be used to test two animals for social compatibility by housing the animals at close quarters. Third, where at least three units are arrayed in a "side-by-side" fashion, the squeezeback in an internal (not on the end) chamber may be used to create a pathway through the rear of the squeezeback to and from cages on either side of the squeezeback cage. And fourth, where a smaller animal is to be housed, the squeezeback function may increase the effective number of cages by a factor of two.

The chambers are defined by a front surface, a top surface, a bottom surface, a rear surface and two side surfaces. The surfaces are preferably square or rectangular. The surfaces may be solid or contain one or more apertures; both kinds of surfaces may be present in the same cage. In some cases, the surfaces are screens or grates. Additional surfaces may be present inside the chamber that are parallel to the bottom and rear surfaces. For example, a flooring grate to separate waste materials from the animal normally will be employed. In addition, some embodiments of the squeezeback function will employ an additional surface parallel to the rear of the cage, rather than employing the rear of the cage, to effect the squeeze.

The side access panels are positioned at the rear of the chamber. In one embodiment, the panels may be self-storing, i.e., when in a opened position they remain attached to the caging unit. This can be accomplished by the use of a track system that runs from the front of the chamber to the rear of the chamber at the top and bottom of the side surfaces. Operation of an access panel is effected simply by sliding the access panel along the track. A handle, flange or other gripping device may advantageously be included to facilitate operation of the access panel. In one embodiment, the handle comprises a bar that is attached to the front edge of the access panel and extends to the front of the chamber, permitting ease of operation where the chambers are arranged in a "side-by-side" fashion. The bar is advantageously hinged such that when pulled forward to open the side access panel, it may be lowered into a vertical storage position. If the tracks are open at one or both ends, the access panel may be completely removed where desired. To prevent unwanted removal from the track, the ends may be secured with caps, set pins, screws or other means that serves to close the tracks.

Figure 1:
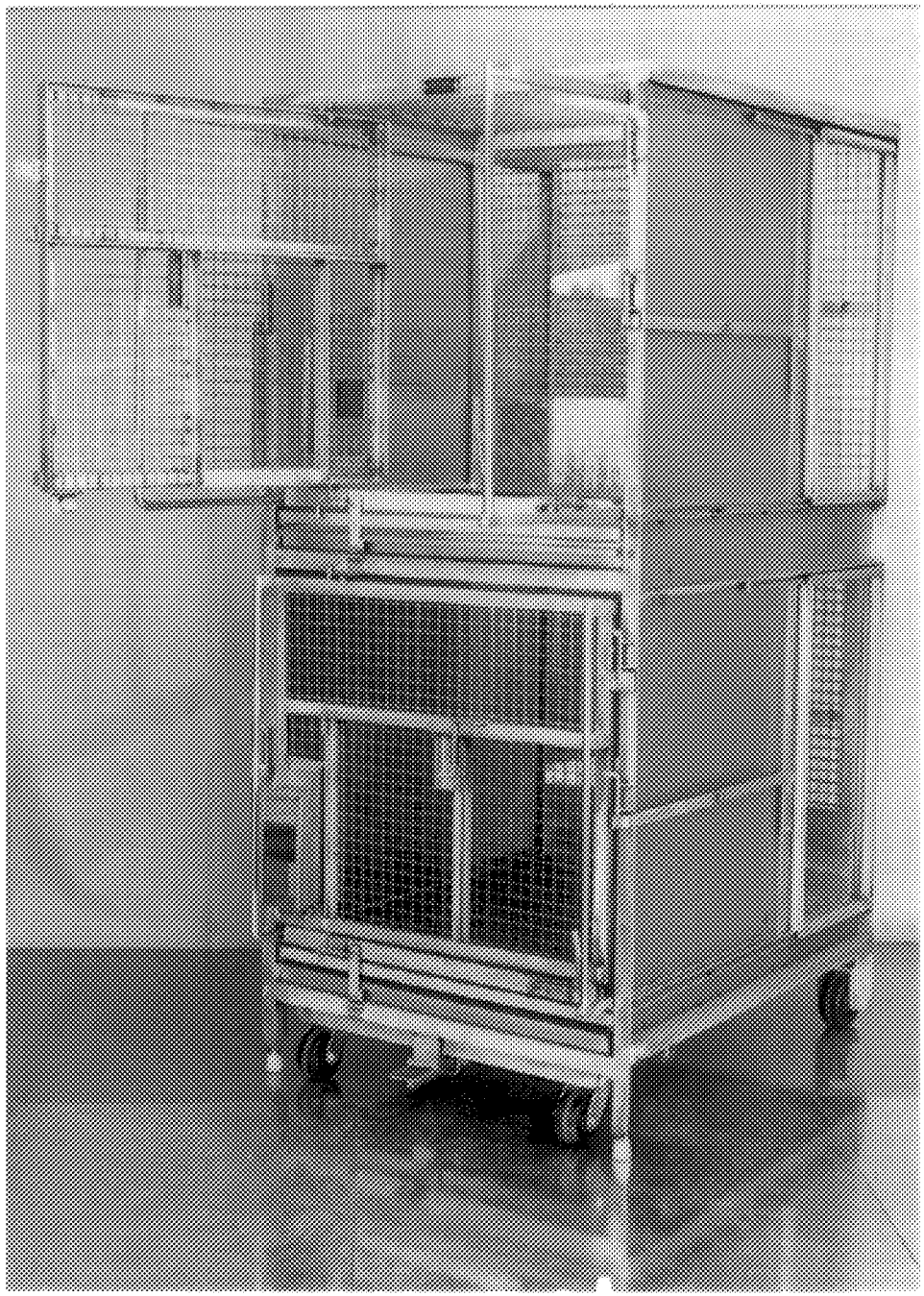
Figure 2:
Figure 3:

FIGS. 1, 2 and 3 show different combinations and forms of the modular caging units. FIG. 1 is an over-and-under design with two units contained in a single frame. Both units are equipped with self-storing, rear-positioned lateral access panels and squeezeback mechanisms. FIG. 2 is a double-height cage with a gasketed front glass door. Lateral, rear-position access panels can be seen on the cage side. FIG. 3 shows three cages arranged in a side-by-side fashion. The center cage is a double-height cage and the left and right cages are over-and-under versions.

In order to permit combination of the individual chambers into multi-chamber caging units, means for reversibly attaching the cages is provided. In one embodiment, a frame is provided into which individual chambers may be inserted. The frame typically may comprise L-shaped elements arranged to receive the chambers into the 90° aspect of the element. Alternatively, the chambers may comprise fastening means for directly attaching one chamber to another such as clamps, latches, tongue-and-groove devices, hooks, snaps or means for receiving bolts, screws or pins.

Figure 4:
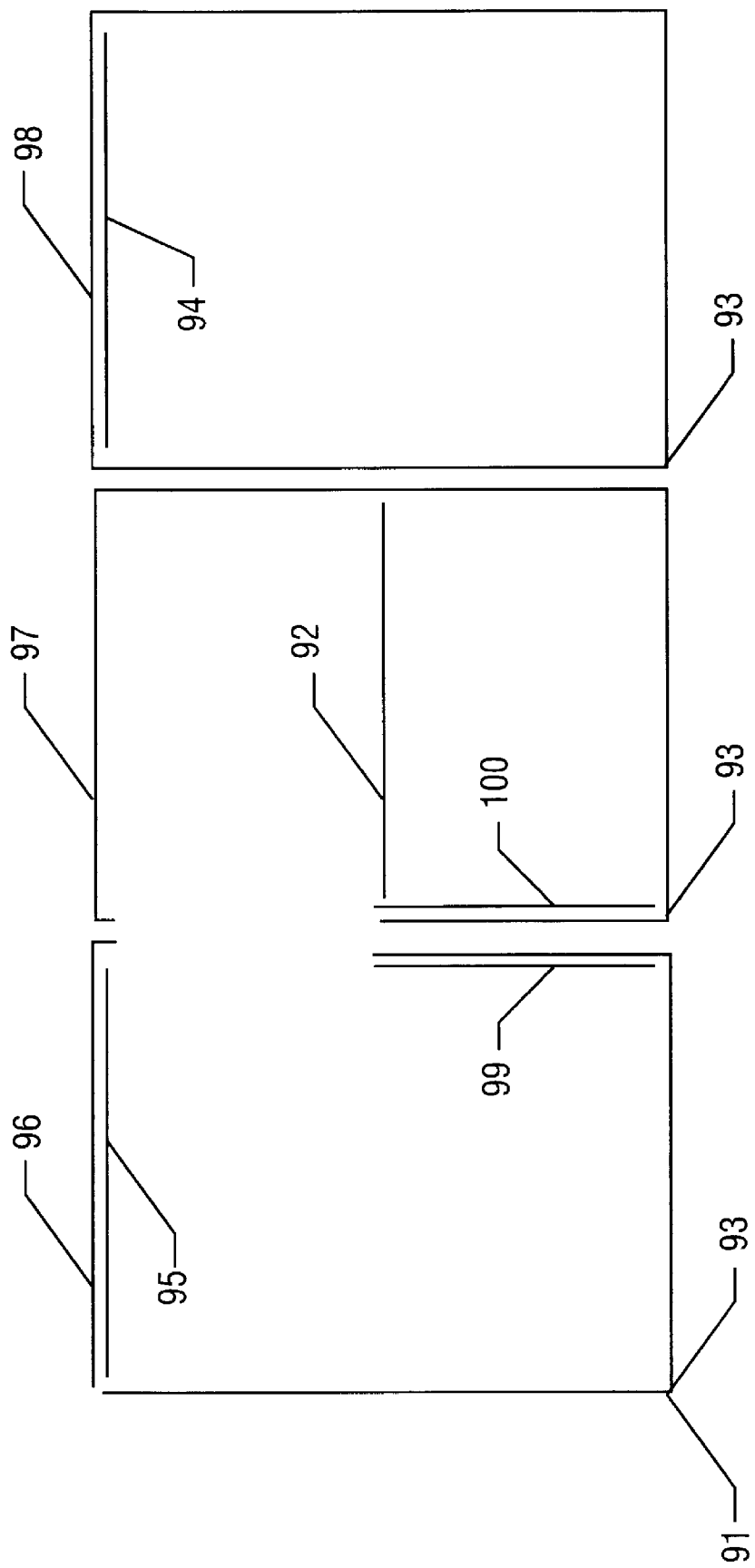
FIG. 4 is an overhead diagrammatic view of a "side-by-side" arrangement of three caging units.

FIG. 4 is a diagrammatic overhead representation of three modular caging units connected in a side-by-side fashion. The cage fronts 91 are covered by hinged doors 93, allowing separate access to each of the cages. In the middle cage, the squeezeback mechanism 92 is in the half-way position, effectively dividing the cage in half. In the left and right cages, the mechanisms 95 and 94, respectively, are in the fully extended position, taking advantage of the full capacity of the cage. Retraction of the side access panel 99 on the right side of the left cage 96 and the side access panel 100 on the left side of the middle cage 97 creates a new chamber that is shared between the left cage and the rear portion of the middle cage. The right side access panel of the middle cage 97 and the left side access panel of the right cage 98, being in an unretracted position, effectively close off access to the right cage from the middle/left cage common chamber.

B. Latching Device for Movable (Removable) Cage Back

As in prior art caging systems, the system described here uses a movable "squeezeback" mechanism to assure that animal occupants of cages are clinically and/or experimentally accessible, especially for therapeutic or immobilizing injections. According to this principle, the movable cage back may be moved forward toward the cage front, thus reducing the size of the area available to the animal occupant and, if necessary, allowing the animal to be briefly pressed between the movable back and the cage front while an injection is administered. A variety of handles and latches exist in the prior art allowing the movable back to be drawn forward. Some of these require the use of two hands to maintain the "squeezeback" in the forward position; others are notched to allow a kind of ratchet effect, preventing the animal from moving the cage back unless the human operator disengages the mechanism. Some, but not all, movable backs in the prior art include a mechanism to keep the animal from moving the movable back forward from the most spacious resting position.

The device described here provides a latching mechanism that can be easily operated with one hand, allows movement and locking in place in many positions along the path of travel, and includes a locking function that prevents the animal occupant from reducing the amount of available space between the movable back and the cage front. When combined with other features of the system described here, this latching mechanism adds functions not available in the prior art.

For example, the movable back may be locked into place half-way forward to provide a divided compartment, the front portion being accessible through the access panel in the cage front, and the back portion being accessible from either of the side access panels. These two compartments may be used for introducing unfamiliar animals to determine compatibility prior to pairing (pair or group housing is required for non-human primates under animal welfare regulations—unless animals are incompatible or there is some other compelling clinical or scientific reason for individual housing). The area behind the movable back also may be used as a tunnel for shuttling an animal or animals between cages on both sides of the cage, even when an animal is present in the front half of the compartment.

In the cage system described here, cage fronts are removable. With the cage front removed, the movable back may also be completely removed from the cage. This feature has seldom if ever been included in the prior art, but is useful if the movable back feature is not needed or if it requires adjustment, repair or replacement. The movable back can be offered as an optional feature rather than a standard feature and can provide for more cost effective housing configurations.

Figure 5:
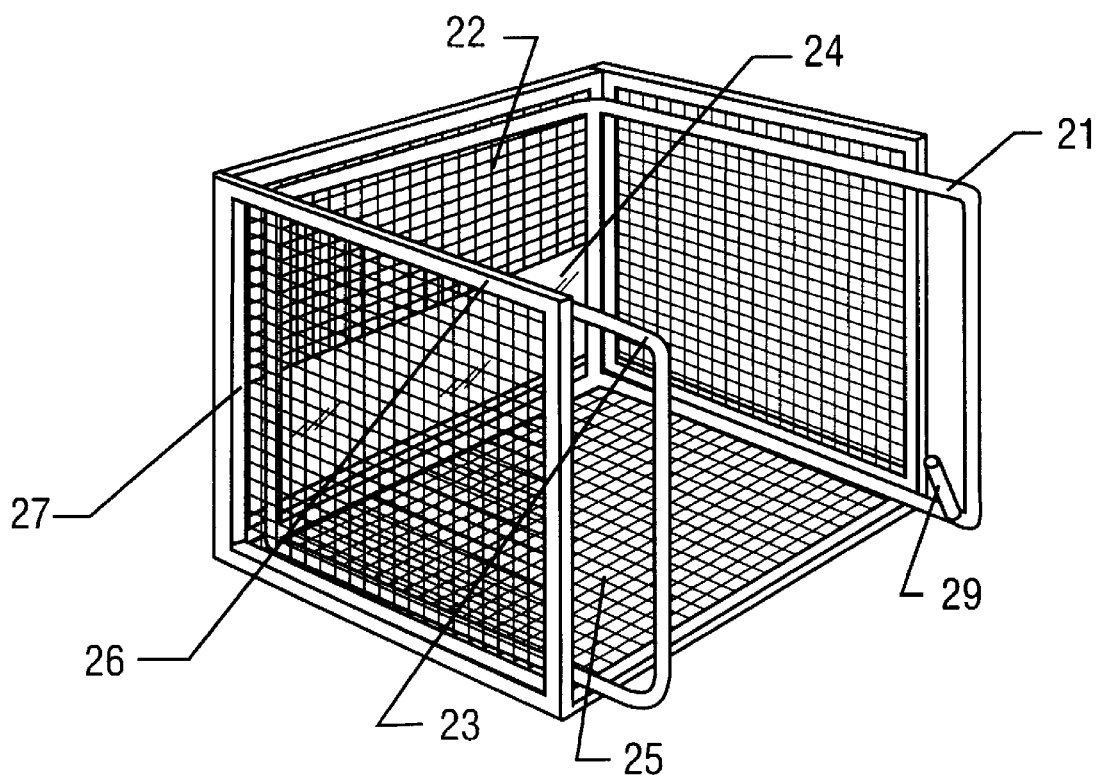
FIG. 5 is an orthographic illustration of a squeezeback latching system and cage. Handles 21 for moving the squeezeback 22 and the handle for the latch 29 are shown.

In FIG. 5, the movable back 27 typically comprises a back framed in stainless, including a stainless sheet panel 24 below and a wire mesh 22 or transparent plastic panel above. On each side of the back a U-shaped handle 21 and 23 is mounted at a 90° angle to the plane of the back. These handles are attached so that the tops of the U are engaged with the movable back 27 and the bottom of the U protrudes through the vertical slotted space 26 lateral to the cage front. This allows the bottom of the U on each side of the cage front to be grasped by an operator to pull the back forward toward the cage front.

The latching mechanism by which this movable back can be anchored or moved is one aspect of the present invention and is shown in FIGS. 6A and 6B. The latching mechanism may comprise a rod (one piece bent, or welded to achieve identical function) that extends from the exterior front next to the lower arm of one of the U-shaped handles, forming a handle 9, then through to the lower corner of the movable back forming an axle 11, where it makes a 90° turn and extends halfway across the bottom of the movable back forming an arm 15, at which point it makes another 90° turn downward forming a short tongue 13. In the resting position, the tongue 13 penetrates the plane of the floor grating or other retainer device, holding the movable back in place by preventing forward or backward movement of the movable back relative to the cage front. The latch handle 9 at the cage front is angled such that movement toward vertical rotates, i.e., 9', the latch axle that extends toward the rear of the cage and lifts the tongue out of the floor grate depression 15'. Thus, the operator may easily disengage the latch from the resting position, pull the movable back forward to a new position, relative to the front of the cage, and there release the latch resulting in the tongue dropping under force of gravity into a floor grate depression. The latch thereby engages and prevents further movement of the movable back until the latch is once again actuated by the operator. In practice, it has been found that this device permits most operators to move the cage back easily using only one hand, leaving the other hand free for other uses.

C. Mobile Cage Unit

Where mobility of the caging unit is desired, a means for transporting the unit will be provided. In one embodiment, the frame described above that receives the modular caging units may be equipped with at least two wheels, rollers or casters. Typically, wheels, rollers or casters will be employed and positioned at the base of the frame such that they swivel freely over 360°. In order to prevent unwanted travel of the cage, a braking mechanism may be provided that fixes the rotation of one or more of the wheels, rollers or casters.

In an alternative embodiment of the mobile unit, shown in FIG. 7, the frame 63 further comprises at least one post 65 that extends downward from the bottom of the unit. By operation a fulcrum device, preferably having a foot-operated pedal 67, operably connected to a fulcrum axle 69, at least some of the wheels 61, rollers or casters may be retracted or the post may be extended so that at least some of the wheels are no longer in contact with the ground and the post is brought into contact with the floor. The weight of the cage on the post helps to prevent unwanted travel when the fulcrum mechanism is engaged. Typically, a cage of this nature has four wheels—two in back fixed to the frame and two in front operably connected to the fulcrum device. In addition, two posts are be present at the front the cage. Operation of the fulcrum device retracts the front wheels and bring the posts into weight-bearing contact with the floor.

D. Food Container

Another aspect of the present invention resides in an improved food container. Because most food containers of the prior art are open to permit easy filling and visual inspection of the contents, a potential hazard exists where an animal may reach through the opening in the cage and out the top of the food container. In order to eliminate this possibility, and the attendant health risks for both the caretaker and animal, a container with an enclosed exterior is provided. An exemplary embodiment is shown in FIGS. 8A, 8B and 8C. The only permanent opening is that opening 79 through which the animal secures food.

In order to address the problem of monitoring food levels, at least a portion of the container is transparent. In one embodiment, the container is rectangular box, having a bottom or cup floor 73, a rear surface 81, two side surfaces 87, and a front face 71 which is transparent. The transparent face may be of any suitably durable material including glass or plastics. Acrylic plastics such as Plexiglas™ are suitable for this purpose. Alternatively, the transparency may be afforded by aperture in an otherwise opaque material. Screens and grates of appropriate size are examples of this embodiment.

Of course, it will be necessary to fill the food container, which means that some form of access to the interior is necessary. In one embodiment, the top of the container may be removed completely. In such a case, it will be held in place by some means that cannot be acted upon by the animal, e.g., externally located clamps, clips, snaps or other locking device. In another embodiment, the top 85 is movable, e.g. hinged, to permit easy refilling. In yet another embodiment, the movement of the top 85 to access the interior of the food container results in the closing of the other opening, thereby eliminating risk of contact during refilling of the container. This may be accomplished, for example, by positioning the hinge such that the opening of the door into the food chamber occludes the food access opening in the rear surface. It may be desirable to provide a catch or latch mechanism to secure the top in the open position during filling and/or in the closed position when an animal has access to the interior of the container.

Food containers typically will be attached to the outside of caging units. A variety of means for attaching the containers may be used including latches, clamps, tongue-in-groove devices, bolts, screws or pins. In one embodiment, the non-transparent face of the container is fitted with at least two elongate tongues 75 positioned at the edge of the container. The tongues fit securely into grooves on the front or side surfaces of a cage chamber. Typically, the grooves will be closed at the bottom end to prevent gravity-induced slippage of the container out of the grooves.

E. Biocontainment Lateral Access Panels

A biocontainment version of the mobile modules is identical in principle, exchangeable and able to interact with the open modules described above. This version also is provided in at least two sizes, 6.0 or 9.0 sq. ft. of floor space per compartment and in two configurations, over/under and full-height activity. The top, back and side are sealed air tight except that, as shown in FIG. 9, the back 93 includes an air exhaust port 91 through which air can be evacuated from the interior. The front has a removable transparent gasketed door with an air intake filter housing and latch capable of clamping the door into a tightly closed position such that the air is drawn through the intake filter as air is evacuated through the exhaust port. Lateral access panels are of the same dimensions and are placed in the same positions as in the open modules. These panels are gasketed such that they can be clamped down to form a seal and prevent air from being drawn into the interior when they are in the closed and clamped position. A clamping means is provided to effect the sealing of the gasket.

A preferred form of this device is the mechanism for clamping the lateral panels to provide a seal and prevent air passage around the perimeter, as shown in FIGS. 10A, 10B and 10C. External to each lateral access panel 43 are two vertical pieces of square tubing 41 mounted such that these pieces can be moved between two positions or states. In the resting state 41' in which the access panel 43 is not clamped down, but is operable (may be opened or closed), a flat side of the square tubing is parallel to the planar of the lateral access panel. In the clamped or closed state 41, the tubing is rotated 45° into a diagonal relationship with plane surface of the access panel 43. When so engaged, the 90° angle corner of the square tube presses firmly against the surface of the access panel 43, thus engaging the perimeter gasketing 47 of the access panel with the smooth and parallel seating surface of the stainless steel side of the enclosure 45, forming a seal and preventing airflow around that perimeter. The square tubing preferably is operated using a lever mounted at the front of the enclosure to assure ease of operation. The tubing acts effectively as a cam to press against the panel surface, bringing into sealing contact with the gasket.

The ability to provide biocontainable lateral access panels that can be easily operated from the front of the enclosure increases abilities to easily transfer an animal such as a non-human primate from a soiled enclosure to a clean enclosure without exposure of the animal to pathogens that might be encountered in transfer boxes or transfer tunnels; further, this device promotes safety of laboratory animal care or animal shelter personnel by reducing the likelihood of exposure to pathogens carried by primates or other animals that might be carrying natural or experimental infectious agents.

What is claimed is:

1. An apparatus for housing animals, comprising a modular caging unit comprising a chamber defined by a
   (a) a front surface, a rear surface, a top surface, a bottom surface and two side surfaces; and
   (b) two self-storing side access panels positioned at the rear of said chamber, wherein said front surface and said side access panels permit access to the interior of said chamber.

2. The apparatus of claim 1, wherein said side access panels are sealed in a airtight manner when said access panels are in a closed configuration.

3. The apparatus of claim 2, wherein said side access panels are bounded by gaskets and at least one square clamping tube is rotatably positioned adjacent to each of said side access panels such that rotation of said clamping tube engages said side access panels such that said gaskets are brought into sealing contact with said caging unit.

4. The apparatus of claim 3, wherein said front surface comprises a transparent, gasketed door and an air intake filter unit.

5. The apparatus of claim 3, wherein said rear surface further comprises an exhaust port.

6. The apparatus of claim 1, wherein said rear surface is movable such that the interior volume of said chamber can be adjusted.

7. The apparatus of claim 1, further comprising a fastening means for attaching said caging unit to another caging unit.

8. The apparatus of claim 7, wherein said attaching comprises a frame for receiving said caging unit.

9. The apparatus of claim 7, wherein said fastening means comprises clamps hooks, snaps or means for receiving bolts screws and pins wherein said fastening means directly attaching one caging unit to another.

10. The apparatus of claim 1, wherein said unit is mobile.

11. The apparatus of claim 10, wherein said apparatus further comprises a plurality of wheels attached to said bottom surface.

12. The apparatus of claim 1, wherein said bottom surface has an area of at least about 9 square feet.

13. The apparatus of claim 1, wherein said rear surface or a surface parallel to said rear surface travels from the rear of said chamber to the front of said chamber.

14. The apparatus of claim 13, wherein at least one handle is attached to said rear surface and extends through an aperture on said front surface.

15. The apparatus of claim 14, wherein said unit further comprises a latching device for fixing the position of said rear surface, said latching device being positioned along the side of said chamber from the front to the rear.

16. The apparatus of claim 15, wherein said latching device comprises a handle and an arm, at opposite ends of an axle, and connected thereby, where said axle is positioned along the side of said chamber from the front to the rear, and said arm further comprises a tongue perpendicular to said arm.

17. The apparatus of claim 16, wherein said bottom surface or a surface positioned parallel to said bottom surface comprises a plurality of apertures, wherein position of said rear surface is fixed by insertion of said tongue into any of said apertures.

18. The apparatus of claim 17, wherein said bottom parallel surface is a grate.

19. The apparatus of claim 13, wherein said rear surface or said parallel surface is detachable.

20. An apparatus for housing animals comprising:
    (a) a first caging unit and a second caging unit comprising chambers defined by
        (i) a front surface, a rear surface, a top surface, a bottom surface and two side surfaces; and
        (ii) two side access panels positioned at the rear of each of said chambers,
    wherein said front surface and said side access panels permit access to the interior of each chamber and said rear surface is movable such that the interior volume of each chamber can be adjusted, and
    (b) a means to attach said first chamber to said second chamber such that said first chamber is positioned above said second chamber.

21. The apparatus of claim 20, wherein said attachment means is a metal frame.

22. The apparatus of claim 20, wherein said attachment means is a clamp.

23. The apparatus of claim 20, wherein said attachment means is a tongue-in-groove mechanism.

* * * * *